UNITED STATES PATENT OFFICE.

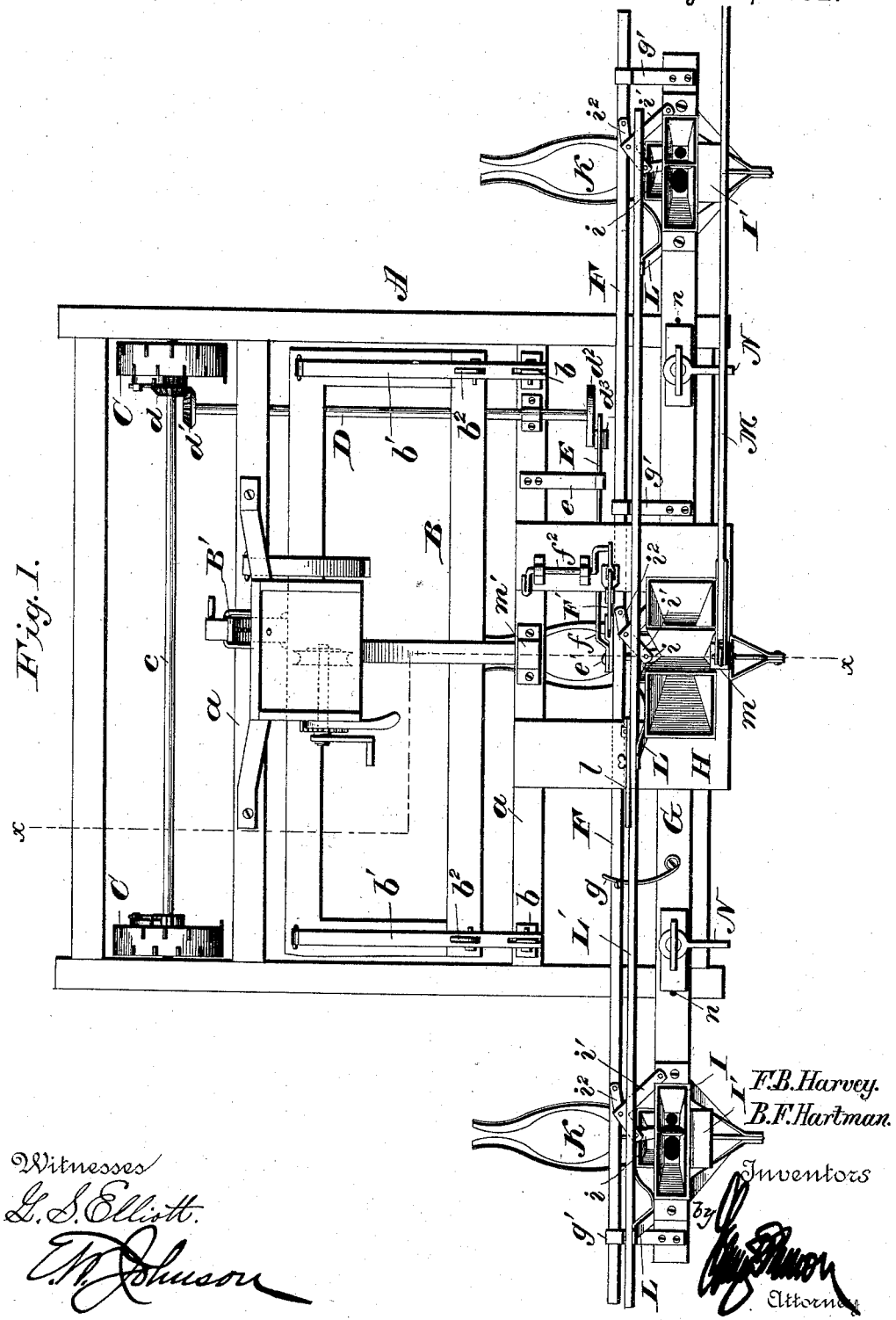

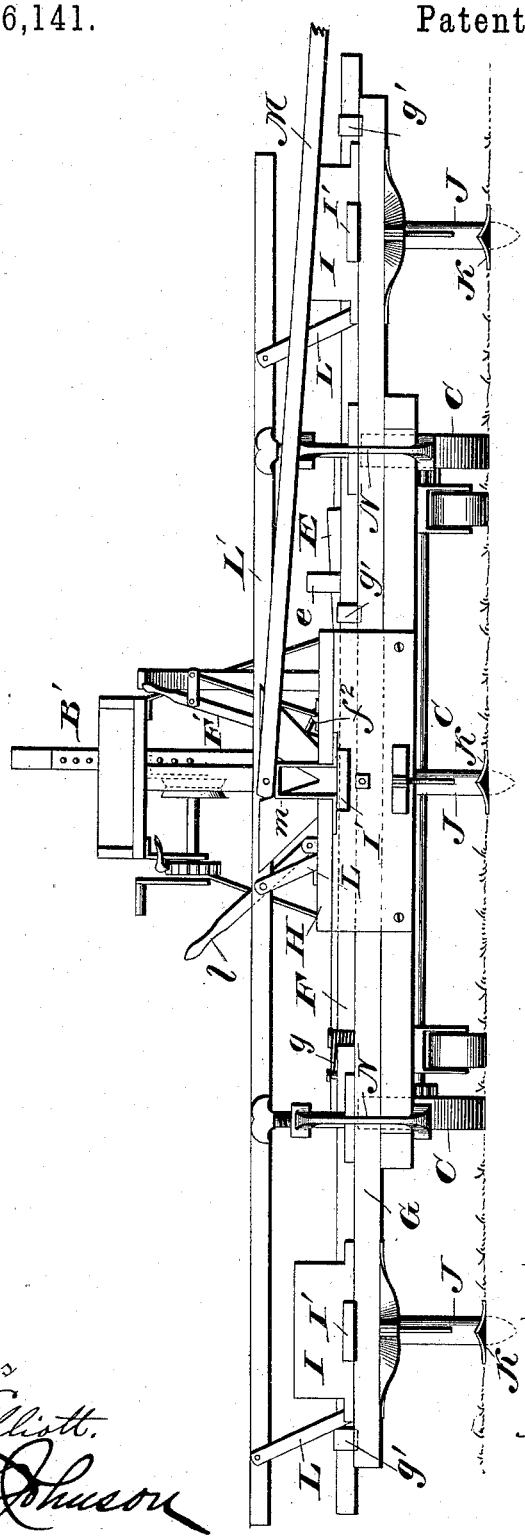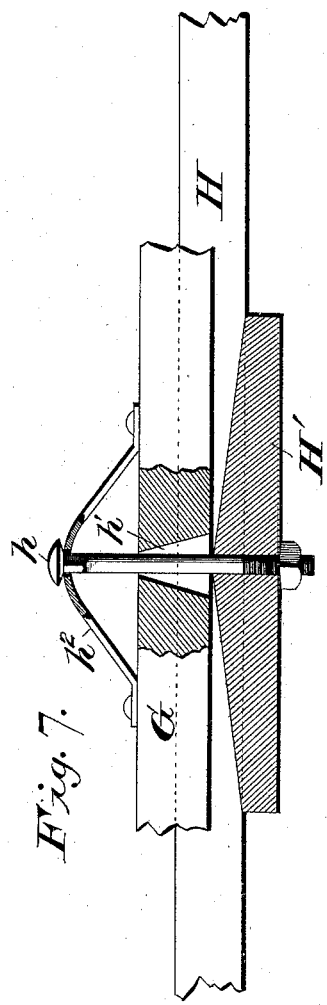

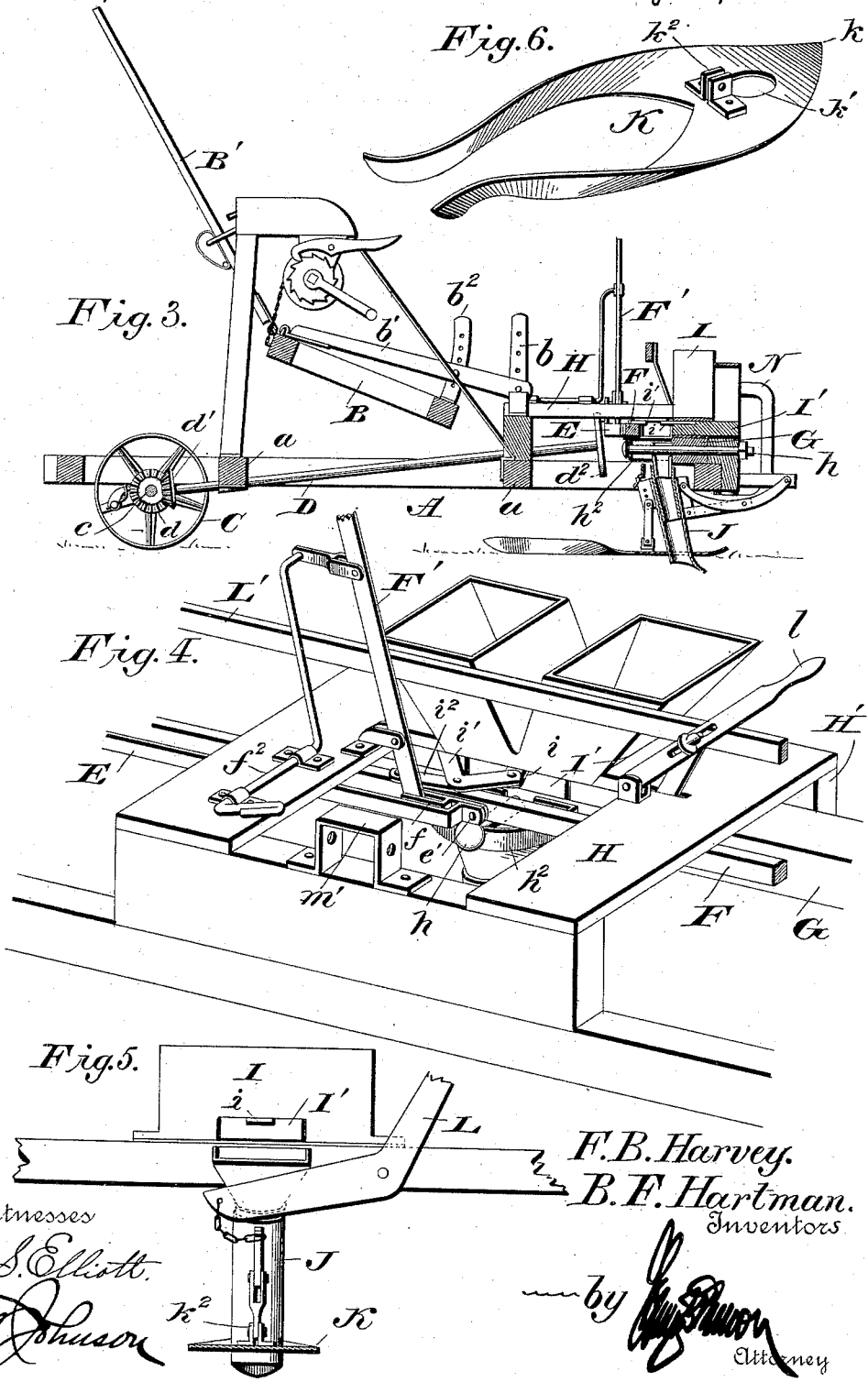

FRANCIS B. HARVEY AND BENJAMIN F. HARTMAN, OF PICKERING, PENNSYLVANIA.

COMBINED HARROW AND CORN-PLANTER.

SPECIFICATION forming part of Letters Patent No. 476,141, dated May 31, 1892.

Application filed April 16, 1891. Serial No. 389,155. (No model.)

*To all whom it may concern:*

Be it known that we, FRANCIS B. HARVEY and BENJAMIN F. HARTMAN, citizens of the United States of America, residing at Pickering, in the county of Chester and State of Pennsylvania, have invented certain new and useful Improvements in a Combined Harrow, Roller, and Corn-Planter; and we do hereby declare the following to be a full, clear, and exact description of the invention, such as will enable others skilled in the art to which it appertains to make and use the same, reference being had to the accompanying drawings, and to letters of reference marked thereon, which form a part of this specification.

This invention relates to improvements in combined seed planters, coverers, and harrows; and it consists in the construction and combination of the parts, as will be hereinafter fully set forth, and particularly pointed out in the claims.

The object of the invention is to provide a seed-planter attachment which can be attached to a harrow and roller frame.

In the accompanying drawings, forming part of this specification, Figure 1 is a plan view showing the seed-planter attachment applied to a harrow-frame. Fig. 2 is a front elevation. Fig. 3 is a transverse sectional view on the line $x$ $x$ of Fig. 1. Fig. 4 is a detail perspective view of one of the seed-boxes and mechanism connected therewith for operating the seed-slides. Fig. 5 is a rear view, partly in section, of one of the seed-spouts, and showing the means for raising and lowering the seed-coverers. Fig. 6 is a detail perspective view of one of the seed-coverers; and Fig. 7 is a view, partly in section, showing the means for connecting the central portion of the seeding attachment to the harrow-frame.

A refers to a rectangular frame, which is provided with cross-bars $a$ $a$, carrying supports for a driver's seat. Between these cross-bars is located a vertically-adjustable harrow-frame B, which is pivotally connected to uprights $b$ $b$, carried by the front transverse bar $a$ by means of bars $b'$, which are hinged or pivotally attached to the rear bar of the harrow, the front bar of said harrow carrying uprights $b^2$, which pass through slots in the bars $b'$ for vertically adjusting said harrow and permitting the same to be raised and lowered. The mechanism for raising the harrow consists of a windlass carried under the driver's's seat and connected by a flexible connection to the rear central portion of the harrow-frame, adjacent to which is located a bar B', having a series of apertures adapted to receive a pin projecting from the rear side of the seat, said bar passing through a bail or loop carrying the cam, which, when turned, will hold the bar in engagement with the pin and retain the harrow-frame depressed. The front and rear portion of the frame A is adapted to receive transverse shafts, upon which rollers may be mounted, and when this frame is intended to receive the corn-planting attachment the rollers are removed and caster-wheels attached adjacent to the front corners of the frame A, while driving-wheels C C are mounted on the shaft $c$, which is suitably mounted in hangers. The wheels C C turn freely upon the shaft and are provided with pawl and ratchets, and one of said wheels has a beveled pinion $d$, which meshes with the pinion $d'$ of the shaft D, which is journaled upon the upper surface of the front transverse beam $a$ and to the under side of the rear transverse beam. The front end of the shaft D carries a disk $d^2$, the pin and plate $d^3$ thereof engaging with the pitman E, which is pivoted to the central portion of the reciprocating bar F. This pitman E passes through a suitable loop or guide $e$, and to the pin or bolt $e'$, which connects the same with the reciprocating bar F, is attached a link $f$, the opposite end of which is connected to a lever F', so that the bar F can be reciprocated manually. This lever F' is also connected with a rock-shaft $f^2$, having a bent end, which will be within reach of the driver's foot, so that he may reciprocate the bar thereby when desired. It will be obversed that the pitman E is not held positively in engagement with the disk and only moves the reciprocating bar F in one direction, it being moved in an opposite direction by the spring $g$, which is carried by the main beam G of the planter. The end of the pitman E is bent for engagement with the projecting portions $d^3$ of the disk $d^2$, so as to draw the bar F in one direction while the spring moves it in the opposite direction. This bar F is supported in suitable hangers $g'$.

To the central front portion of the frame A and to the transverse bar $a$ is rigidly secured a platform H, and beneath this platform, so as to lie immediately above the front transverse bar of the harrow-frame, the main beam G is bolted by a horizontal bolt $h$, the front vertical board H' of the platform being oppositely inclined on its rear face, as shown in Fig. 7, while the beam G is provided with a tapered aperture $h'$, through which the bolt $h$ passes, a curved plate $h^2$ being secured to project horizontally from the rear edge of the beam G, thus permitting said beam when the other fastening means are detached to rock upon the bolt, so that the angle thereof with respect to the frame A may be varied without throwing the seed-slide operating mechanism out of gear, and for this reason the pitman E is not rigidly connected to the disk $d^2$.

The beam G, in addition to the parts hereinbefore referred to, carries the seed-boxes I, seed-dropping mechanism, drills, and coverers, as well as means for raising and lowering the coverers. The boxes I are provided with two compartments, one to receive a fertilizer and the other the grain. The seed-slides reciprocate at right angles with the beam G, said seed-slides proper being of ordinary construction and having at their rear ends links $i$, which are connected to bell-crank levers $i'$, the long end of said bell-crank lever being pivoted to the beam G adjacent to the seed-boxes, while the angle-plate is connected by a link $i^2$ to the reciprocating bar F. By this construction it will be observed that when the bar F is held in its normal position by the spring $g$ the apertures in the slides I' will be within the boxes I, and as this bar is moved in an opposite direction by the pitman and disk the slides I' will be directly over the openings in the drills, said openings being in rear of the beam G. The drills or seed-spouts J are of the usual construction, and mounted upon the same are coverers K, said coverers having front upturned portions $k$, apertures $k'$, through which the seed-drill passes, and in rear of said apertures angle-plates $k^2$, with which connect links and means for raising and lowering said coverers upon the drills J. The rear ends of the coverers are curved so as to have nearly-vertical portions, from which the rearwardly-extended members converge, and are bent or twisted, as shown in Fig. 6, so that the earth will be gathered by the inner side of said coverers, while the end members throw the same over the furrows opened by the drill-point. Each coverer K is connected to the short end of a lever L, the long end of which connects with a bar L', and by shifting said bar by means of the hand-lever $l$ the position of the coverer upon the drill J can be varied to suit the different conditions of the soil.

The draft pole or tongue passes into and is secured to loops $m$ and $m'$, carried by the frame or platform H, and to the front loop $m$ is pivoted a marker-bar M, from which hangs a chain or other device. This marker M can be turned upon its pivot to locate it on either side of the planter.

The main bar G, as hereinbefore stated, is pivotally secured to the frame A by a bolt $h$ and is normally held at right angles to the side beams of the frame A by clamps N N; but when it is desired to locate said bar G at an angle with the frame it can be accomplished by removing the clamps and passing pins through the perforations $n$, which will register with perforations in the frame A when the bar G is turned upon its pivot-bolt. By providing this means of adjustment the distance between the rows can be varied to the extent usually desired.

Having thus described our invention, what we claim as new, and desire to secure by Letters Patent, is—

1. In combination with the frame A, having a driving-shaft, and disk $d^2$, carrying a projection $d^3$, a bar for actuating the seed-slide removably connected to a pivoted bar G, a pitman E, pivoted to the bar F, and crank-arms $i'$, pivoted to the bar G adjacent to the seed-slide and connected to the reciprocating bar F by links $i^2$, substantially as shown, and for the purpose set forth.

2. In combination with the frame A, a bar G, carrying the seed-planting mechanism, said bar being pivotally connected to the frame A by a horizontal bolt $h$, and supplemental means for holding the bar rigid to the frame, substantially as shown, and for the purpose set forth.

3. The combination, in a planter having a frame A and platform H, rigidly secured thereto, clamps N for retaining in position a bar G, a horizontal bolt $h$, operating in conjunction with the clamps, said bar G carrying seed-boxes and reciprocating seed-slide, the seed-slide being connected to a bar F, located in rear of the bar G and connected thereto by bell-crank levers $i'$ and supports $g'$, the bar F, carrying a pivoted pitman E, having a bent end for engagement with a projection 3 on the disk $d^2$, substantially as shown, and for the purpose set forth.

4. The combination, in a planter, of a bar G, carrying seed-boxes, and a sliding bar F, located in rear of the same, bell-crank levers $i'$, pivoted to the bar G and connected by links $i$ and $i^2$ to the seed-slide and bar F, a spring $g$ for moving the bar F in one direction, and a hand and foot lever connected to each other and to the bar F, substantially as shown, and for the purpose set forth.

5. In combination with a reciprocating bar F for operating the seed-slides of a planter, a spring or springs for moving the bar in one direction, and a pitman which intermittently engages with a projection $d^3$, carried by a disk $e^2$, a hand-lever F', connected with the reciprocating bar, and a foot-lever $f^2$, connected with the hand-lever, substantially as set forth.

6. The combination, in a seed-planter pivotally attached to a frame having a driven disk, as $d^2$, of a pivoted pitman having a hooked end which engages with a projection $d^3$, carried by the disk, a spring for moving the bar F in an opposite direction from what it is moved by the disk and pitman, seed-slides connected to the reciprocating bar, so as to be moved at right angles therewith, and means for manually moving the bar F, substantially as set forth.

7. In combination with the frame A, having a transverse shaft $c$, and a driving-shaft D at right angles therewith, a bar G, carrying the seed-planting mechanism, said bar being removably connected by a horizontal pivot to the front central portion of the frame A, means for holding the bar G either at right angles with the frame A or oblique thereto, and a pitman E for connecting the planting mechanism with the driving-shaft, substantially as shown, and for the purpose set forth.

8. In combination with the drills J, covers K, having upturned forward ends, apertures $k'$, through which the drills pass, and angle-plates $k^2$ for connecting said coverers in rear of the drills with adjusting means, the rear members of the coverers being curved, substantially as set forth.

In testimony whereof we affix our signatures in presence of two witnesses.

FRANCIS B. HARVEY.
BENJAMIN F. HARTMAN.

Witnesses:
ANNIE E. HARTMAN,
JENNIE R. HARTMAN.